(12) United States Patent
Chirca et al.

(10) Patent No.: US 9,208,120 B2
(45) Date of Patent: Dec. 8, 2015

(54) MULTI-PROCESSOR, MULTI-DOMAIN, MULTI-PROTOCOL CACHE COHERENT SPECULATION AWARE SHARED MEMORY CONTROLLER AND INTERCONNECT

(71) Applicant: Texas Instruments Incorporated, Dallas, TX (US)

(72) Inventors: Kai Chirca, Dallas, TX (US); Matthew D. Pierson, Murphy, TX (US); Daniel B. Wu, Dallas, TX (US); Timothy D. Anderson, University Park, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 224 days.

(21) Appl. No.: 14/061,979

(22) Filed: Oct. 24, 2013

(65) Prior Publication Data
US 2014/0149690 A1 May 29, 2014

(51) Int. Cl.
G06F 15/00 (2006.01)
G06F 13/42 (2006.01)
G06F 12/08 (2006.01)
G06F 13/16 (2006.01)
H04L 29/06 (2006.01)
G06F 1/12 (2006.01)

(52) U.S. Cl.
CPC ............ *G06F 13/42* (2013.01); *G06F 12/0815* (2013.01); *G06F 12/0828* (2013.01); *G06F 12/0831* (2013.01); *G06F 13/1626* (2013.01); *G06F 13/1663* (2013.01); *H04L 63/0263* (2013.01); *Y02B 60/1225* (2013.01)

(58) Field of Classification Search
CPC ............ G06F 15/00; G06F 1/12; G06F 13/00
USPC ...................... 712/32, 203; 713/375; 710/317
See application file for complete search history.

(56) References Cited

U.S. PATENT DOCUMENTS

| | | | | |
|---|---|---|---|---|
| 5,404,462 A * | 4/1995 | Datwyler et al. | ............. | 713/600 |
| 5,845,060 A * | 12/1998 | Vrba et al. | ....................... | 714/12 |
| 6,487,699 B1 * | 11/2002 | Devins et al. | ................. | 716/106 |
| 7,328,270 B1 * | 2/2008 | Reents et al. | ................. | 709/230 |
| 7,600,080 B1 * | 10/2009 | Bhattacharyya et al. | ...... | 711/143 |
| 2005/0021874 A1 * | 1/2005 | Georgiou et al. | ............. | 709/250 |
| 2005/0268072 A1 * | 12/2005 | Najam et al. | ..................... | 712/34 |
| 2006/0004912 A1 * | 1/2006 | Najam et al. | .................. | 709/213 |
| 2007/0050530 A1 * | 3/2007 | Rajan | ................. | 711/5 |
| 2007/0239966 A1 * | 10/2007 | Georgiou et al. | ............... | 712/28 |
| 2009/0150893 A1 * | 6/2009 | Johnson et al. | ............... | 718/104 |
| 2009/0158075 A1 * | 6/2009 | Biberstein et al. | ............ | 713/375 |
| 2009/0172243 A1 * | 7/2009 | Champagne et al. | ............ | 711/3 |
| 2009/0172423 A1 * | 7/2009 | Song et al. | ..................... | 713/300 |
| 2009/0217277 A1 * | 8/2009 | Johnson et al. | ............... | 718/102 |
| 2010/0250821 A1 * | 9/2010 | Mueller | ........................ | 710/313 |
| 2012/0066509 A1 * | 3/2012 | Lapp et al. | .................... | 713/189 |
| 2012/0239883 A1 * | 9/2012 | Jain et al. | ...................... | 711/122 |
| 2013/0007414 A1 * | 1/2013 | Sharma | .......................... | 712/38 |

(Continued)

Primary Examiner — Christopher Shin
(74) Attorney, Agent, or Firm — Robert D. Marshall, Jr.; Frank D. Cimino

(57) ABSTRACT

This invention combines a multicore shared memory controller and an asynchronous protocol converting bridge to create a very efficient heterogeneous multi-processor system. After traversing the protocol converting bridge the commands travel through the regular processor port. This allows the interconnect to remain unchanged while having any combination of different processors connected. This invention tightly integrates all of the processors into the same memory controller/interconnect.

9 Claims, 11 Drawing Sheets

(56) References Cited

U.S. PATENT DOCUMENTS

| | | | |
|---|---|---|---|
| 2013/0339558 A1* | 12/2013 | Zhu et al. | 710/105 |
| 2013/0339778 A1* | 12/2013 | Smentek et al. | 713/600 |
| 2014/0095909 A1* | 4/2014 | Turullols | 713/322 |
| 2014/0281610 A1* | 9/2014 | Biswas et al. | 713/322 |
| 2014/0281735 A1* | 9/2014 | Olivarez et al. | 714/40 |

* cited by examiner (1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

| 31 ooo 29 | 28 | 27 ooo 23 | 22 ooo 18 | 17 ooo 13 | 12 ooo 2 | 1 | 0 |
|---|---|---|---|---|---|---|---|
| creg | z | dst | src2 | scr1/cst | opcode | s | p |

MULTI-PROCESSOR, MULTI-DOMAIN, MULTI-PROTOCOL CACHE COHERENT SPECULATION AWARE SHARED MEMORY CONTROLLER AND INTERCONNECT

CLAIM OF PRIORITY

This application claims priority under 35 U.S.C. 119(e)(1) to U.S. Provisional Application No. 61/717,872 filed Oct. 24, 2012.

TECHNICAL FIELD OF THE INVENTION

The technical field of this invention is cache for digital data processors.

BACKGROUND OF THE INVENTION

This invention is applicable to data processing systems with multi-level memory where the second level (L2) memory used for both unified (code and instructions) level two cache and flat (L2 SRAM) memory used to hold critical data and instructions. The second level memory (L2) is used for multiple purposes including unified instruction and data level two cache, directly addressable SRAM memory used to hold critical data and code accessible by both external and internal direct memory access (DMA) units.

When the level one data cache controller is granted access to the level one data cache, this access could force an existing line to be evicted. The CPU can also force the level one data cache to evict lines though the block writeback operation. At the same time, the level two cache could be receiving a DMA access to the same line. This situation could break coherency, if DMA data were committed incorrectly. This could occur by writing to the level two memory then overwriting that data with the level one cache victim. This could also occur by sending the DMA data as a snoop write to the level one data cache. This forces the level one data cache to write the DMA data to its cache after the victim has been evicted. This effectively, drops the DMA write. Thus when a victim is in progress, a DMA write sent as snoop could miss the victim.

Creating a heterogeneous multi-processor system can have many advantages and added flexibility. This comes with many challenges. The multiple processing cores possibly have different bus protocols. This creates a problem in how to you integrate components efficiently which speak different languages. These different protocols often make different ordering guarantees that must be unified without demolishing performance of either. The multiple processing cores may have different operating frequencies that aren't necessarily integral multiples of each other. This creates a problem in how to integrate these together to get maximum utilization of both, how to get these heterogeneous processors to work well together. There is a problem in how each processor operate individually at full utilization and efficiently share data. Answering these questions has a major effect on the overall efficiency and performance of the system.

SUMMARY OF THE INVENTION

This invention combines a multicore shared memory controller and an asynchronous protocol converting bridge to create a very efficient heterogeneous multi-processor system. The asynchronous protocol converting bridge is a low-latency asynchronous bridge allowing the memory controller and the processor to operate at completely different frequencies and voltages. After traversing the protocol converting bridge the commands travel through the regular processor port. This allows the interconnect to remain unchanged while having any combination of different processors connected.

Most prior art solutions available divides the processors into their native groups with an interconnect speaking their native language. These interconnects may or may not be connected via a bridge or bridges allowing access to the other side.

This invention tightly integrates all of the processors into the same memory controller/interconnect. This provides several advantages. Solutions which separate the processors will have much higher latency to resources not on the local native interconnect. This invention has much lower latency to all resources which facilitates much more efficient sharing of data across the processors. This is very powerful combined with the hardware coherence support provided by the multi-core shared memory controller. The integration of all processor types helps systems that mainly focus on using one type of processor. In the separated solution the resources must be split across the two interconnects in some predetermined fashion. Splitting the resources like this will drastically affect the performance of different applications, making the part less flexible. In this invention all resources are easily available to all processor types, maximizing system flexibility. Converting all masters to the same protocol in the bridge reduces the required complexity in the interconnect/memory controller. Reducing the amount of state necessary in the interconnect is key to ensuring maximum bandwidth from all masters to all memory. Minimizing the complexity of the memory controller is key to quick/bug free development.

In this invention all CPU ports speak the same language which allows a quick easy platform approach to manufacturing different devices for different markets. This invention permits plugging in different combinations of processors into the processor ports without memory controller/interconnect RTL changes.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
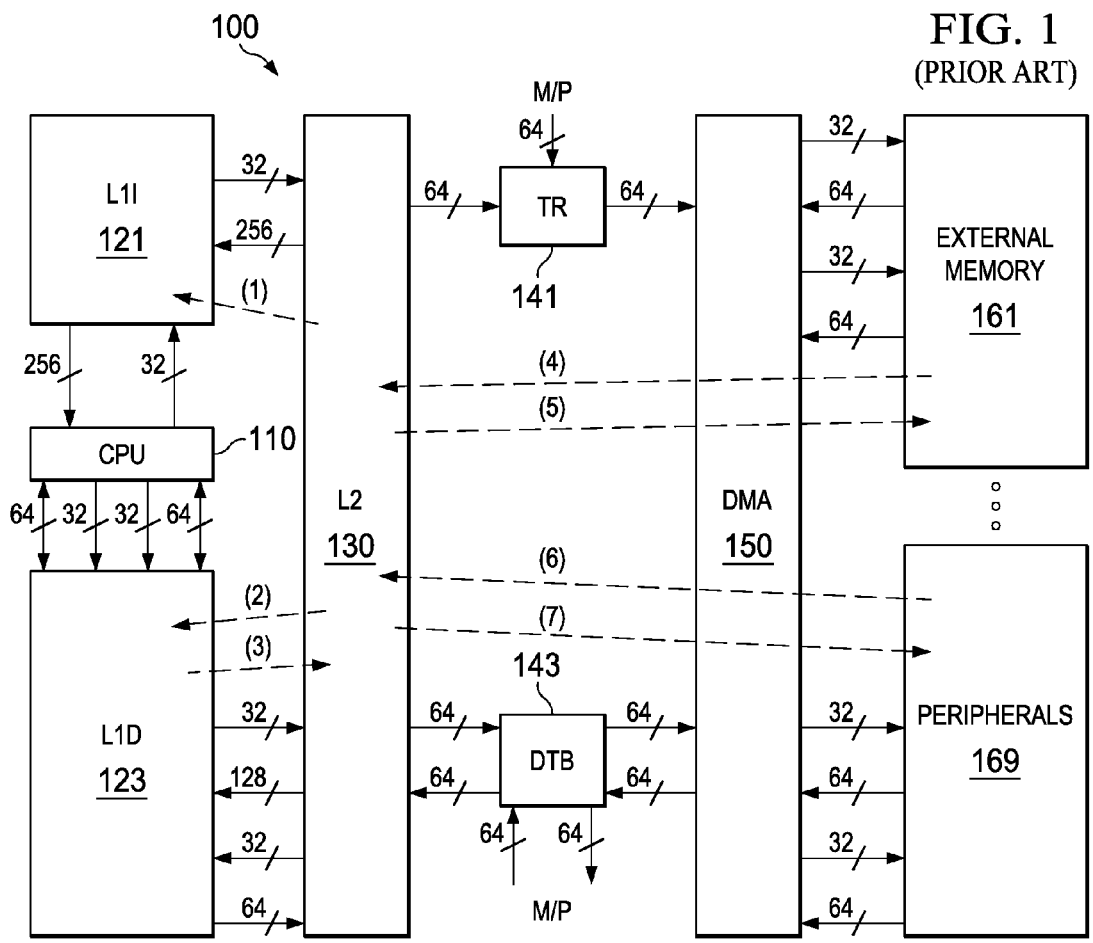
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

FIG. 1 illustrates several data/instruction movements within the digital signal processor system 100. These include: (1) instructions move from L2 cache 130 to L1I cache 121 to fill in response to a L1I cache miss; (2) data moves from L2 cache 130 to L1D cache 123 to fill in response to a L1D cache miss; (3) data moves from L1D cache 123 to L2 cache 130 in response to a write miss in L1D cache 123, in response to a L1D cache 123 victim eviction and in response to a snoop from L2 cache 130; (4) data moves from external memory 161 to L2 cache 130 to fill in response to L2 cache miss or a direct memory access (DMA) data transfer into L2 cache 130; (5) data moves from L2 cache 130 to external memory 161 in response to a L2 cache victim eviction or writeback and in response to a DMA transfer out of L2 cache 130; (6) data moves from peripherals 169 to L2 cache 130 in response to a DMA transfer into L2 cache 130; and (7) data moves from L2 cache 130 to peripherals 169 is response to a DMA transfer out of L2 cache 130.

Figure 2:
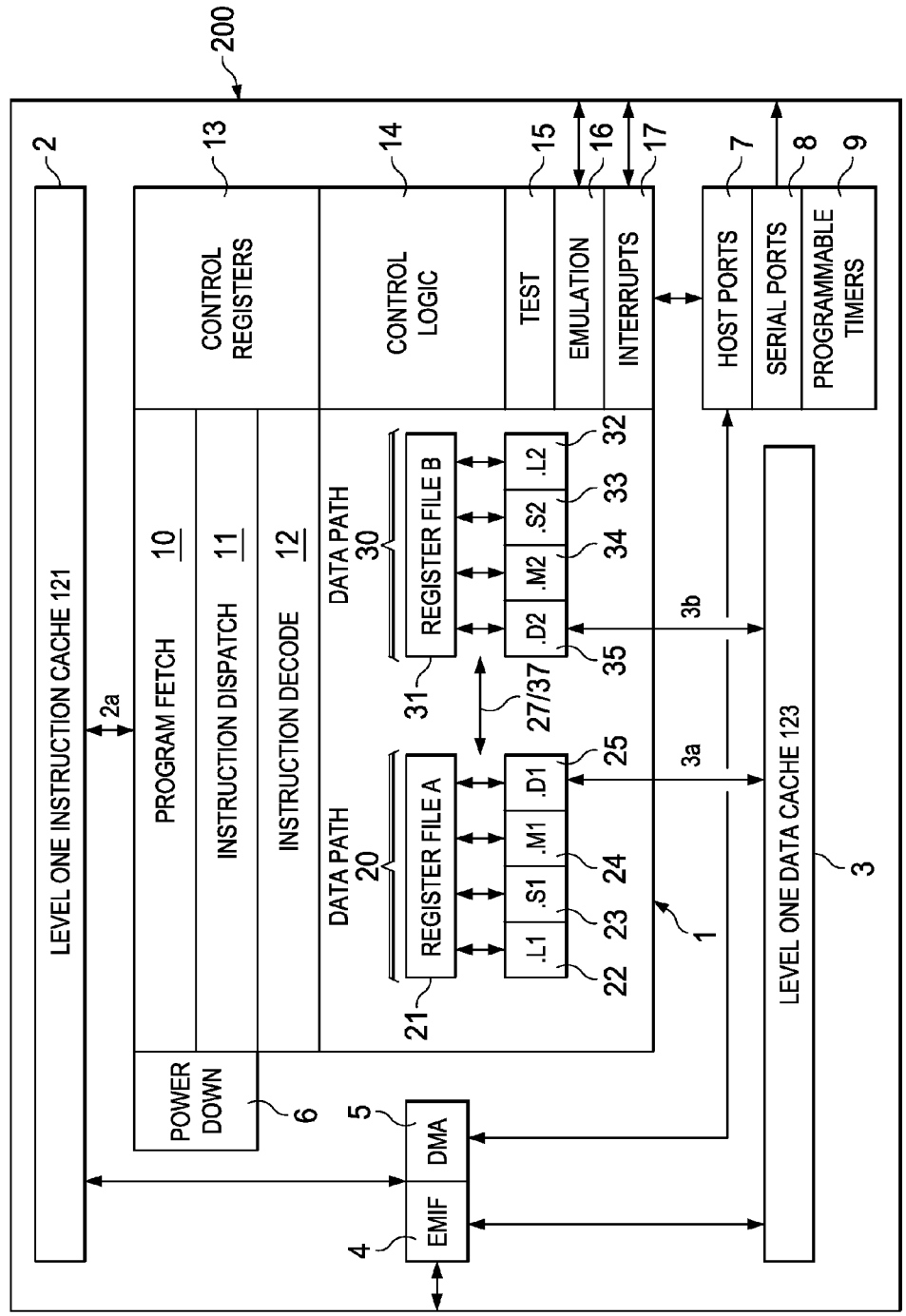
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level one instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs simultaneously in each of the two data paths 20 and 30. As previously described each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
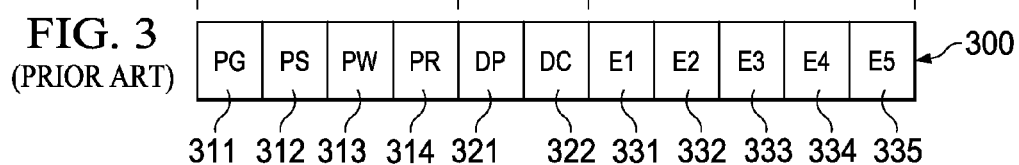
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320;

and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16 by 16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extension instructions, the results are written to a register file. Multiply extension instructions complete during the E4 phase 334.

During E5 phase 335, load instructions write data into a register. Load instructions complete during the E5 phase 335.

Figures 4, 5:
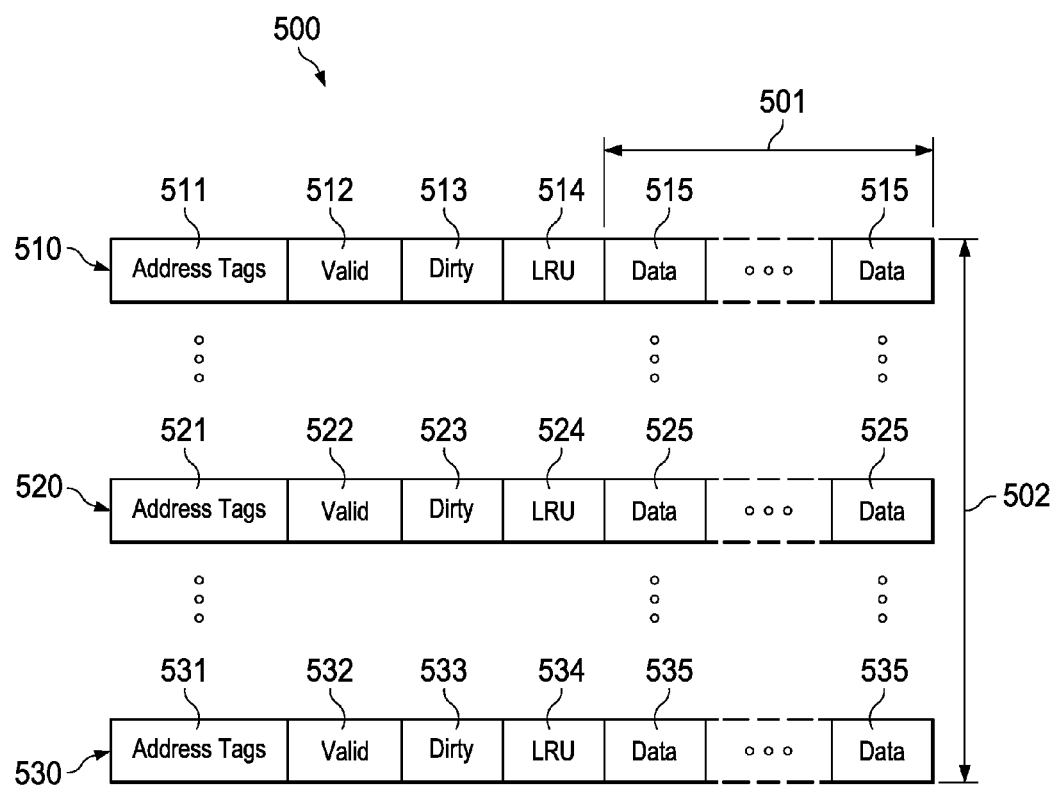
FIG. 4 illustrates the instruction syntax of the very long instruction word digital signal processor core illustrated in FIG. 2 (prior art)
FIG. 5 illustrates the details of a set of typical prior art cache lines (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

FIG. 5 illustrates the details of plural cache lines such as used in L1I cache 121, L1D cache 123 and L2 cache 131 illustrated in FIG. 1. Cache 500 illustrated in FIG. 5 includes cache lines 510, 520 and 520 are representative of the internal structure of cache 500. Each of cache lines 510, 520 and 530 includes: respective address tags 511, 521 and 522; respective valid bits 512, 522 and 523; respective dirty bits 513, 523 and 533; respective least recently used (LRU) indicators 514, 524 and 534; and respective data words 515, 525 and 535. Each cache line 510, 520 and 530 includes plural respective data words 515, 525 and 535. The bit length of data words 515, 525 and 535 is set by the minimal addressable data amount of CPU 110. This is typically 8 bits/1 byte.

Cache 500 stores data from more distant memories such as external memory 131 which are accessed by a multi-bit address. Cache 500 is organized to facilitate this storage and to facilitate finding such data in the cache. Each cache line 510, 520 and 530 typically stores $2^N$ respective data words 515, 525 and 535, when N is an integer. The position of data words 515, 525 and 535 within the corresponding cache line 510, 520 and 530 along the dimension 501 serves as a proxy for the least significant bits of the address.

The position of cached data within lines along dimension 502 serves as a proxy for the next most significant bits of the address. The corresponding address tags 511, 521 and 531 form the remainder of the data word address. To determine if a memory access is to data cached within cache 500 (a cache hit), cache 500 compares the address tags for all cache lines to the most significant bits of the memory location accessed. Upon a detecting a match, the position within the cache line along dimension 501 corresponds to the least significant bits of the address permitting identification of the data word accessed.

Each data word 510, 520 and 530 includes a corresponding valid bit 512, 522 and 532. A first state of this valid bit indicates the corresponding data words 515, 525 or 535 are valid. An opposite state of this valid bit indicates the corresponding data words 515, 525 or 535 are not valid. There are several instances where data stored within cache 500 would not be valid. Upon initial activation of digital signal processor system 100 the L1I cache 121, L1D 123 cache and L2 cache 131 would not be loaded. Thus they would not store valid data. Accordingly, all cache lines are initially marked invalid. During a cache access a match of a requested address with address tags 511, 521 or 531 would not detect a match unless the corresponding valid bit 512, 522 or 532 indicated the data was valid.

Each data word 510, 520 and 530 includes a corresponding dirty bit 513, 523 and 533. A first state of this valid bit indicates the corresponding data words 515, 525 or 535 are dirty. An opposite state of this valid bit indicates the corresponding data words 515, 525 or 535 are not dirty (clean). Cache memory is generally used for both read accessed and write accesses. Upon a cache hit for a write access, the write data is written into the corresponding location within cache 500. According to the preferred writeback technique, this write data is not immediately forwarded to external memory 131. Instead the respective dirty bit 513, 523 or 533 is set to indicate dirty. A dirty indication means that there has been a write to the cached data not currently reflected in the base memory. According to the writeback technique this data is written to the base memory with the expectation that this writeback can accumulate plural writes to the memory location and nearby memory locations within the same cache line to reduce traffic on the bus to external memory 131.

The least recently used (LRU) bits 514, 524 and 534 are used when a cache line is replaced. Because the cache cannot hold all the data stored in the large, slow memory, the data within the cache must be replaced with new data regularly. Using a data words location within dimensions 501 and 502 as proxy for the least significant bits introduces a problem in locating data within cache 500. If there is only a single cache line having the same location on dimensions 501 and 502, then plural data from the large, slow memory will alias to the same cache line in cache 500. This is data having the same least significant address bits corresponding to dimensions 501 and 502 but differing most significant address bits. An access to such aliased data would require the previous data at that cache line to be replaced. This is considered disadvantageous. A typical prior art cache is set associative. Thus a set of cache lines have the same location on dimensions 501 and 502. Typical sets include two members (two-way set associative) or four members (four-way set associative). Each cache line of such a set is called a way. A cache miss to an address that aliases to one of these sets needs only to evict one of these ways. Determination of which way to evict is typically made based on prior usage of these ways. According to both the temporal and spatial locality principles more recently used cache ways are more likely to be reused than less recently used cache ways. LRU bits 514, 524 and 534 track accesses to cache ways within the set. When data is to be replaced the LRU bits indicate the least recently used way for replacement. Maintaining cache coherence requires writeback of a dirty way upon such replacement.

Figure 6:
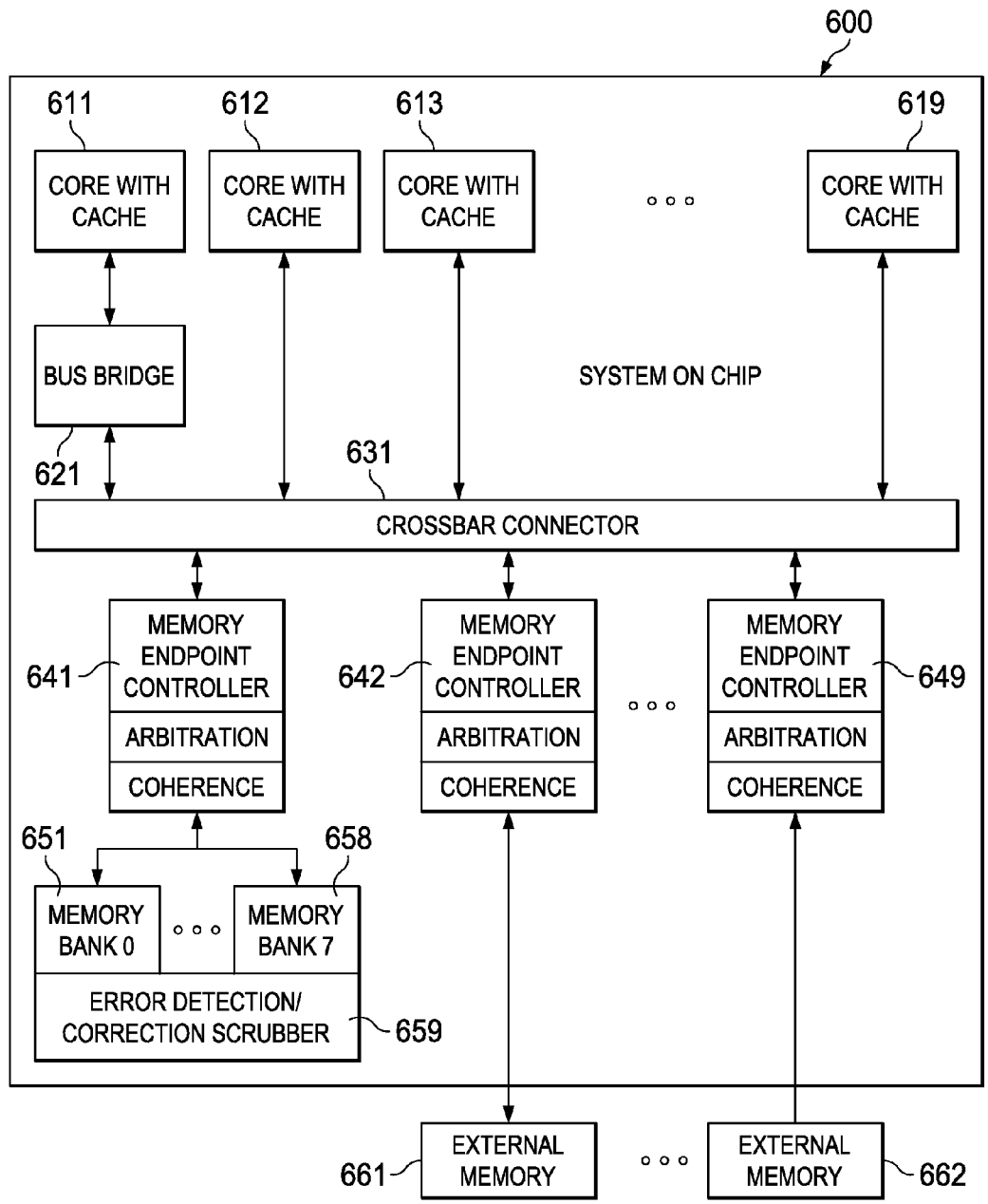
FIG. 6 illustrates a preferred embodiment of a system on a chip of this invention.

FIG. 6 illustrates the construction of system on chip (SoC) 600 according to this invention. SoC 600 includes plural processing cores with cache 611, 612, 613 . . . 619. At least one of processing cores with cache 611, 612, 613 . . . 619 are preferably constructed as illustrated in FIGS. 1 and 2. FIG. 6 illustrates that core with cache 611 in connected to crossbar connection 631 via bus bridge 621. Details of the preferred embodiment of bus bridge 621 as given below in FIG. 7. FIG. 6 illustrates four processing cores with cache 611, 612, 613 . . . 619 but this invention could be practiced with any suitable plural number of processing cores with cache.

Crossbar connection 631 can simultaneously connect any of processing cores with cache 611, 612, 613 . . . 619 with any of memory endpoint controllers 641, 642 . . . 649. Crossbar connector 631 can simultaneously make any non-interfering connection. A non-interfering connection includes connections with only one processing core with cache and only one memory endpoint controller. Crossbar connector 631 cannot connect more than one processing core with cache to a single memory endpoint controller simultaneously nor can it connect a single processing core with cache to more than one memory endpoint controller simultaneously.

Each of memory endpoint controllers 641, 642 . . . 649 controls access to a memory or memory-like peripheral such as peripherals 169 illustrated in FIG. 1. This access control includes access arbitration and coherence control. Details of these operations will be described below. This construction distributes coherence control from the processing cores with cache 611, 612, 613 . . . 619 to the memories. Memory coherence controller 641 controls access to on-chip memory in the form of memory bank 0 651 through memory bank 7 658. Memory bank 0 651 and memory bank 7 658 are coupled to Error detection and correction scrubber 659. Operation of error detection and correction scrubber 659 will be described below. Memory endpoint controller 642 controls access to external memory 661. Memory endpoint controller 649 controls access to external memory 669.

Figure 7:
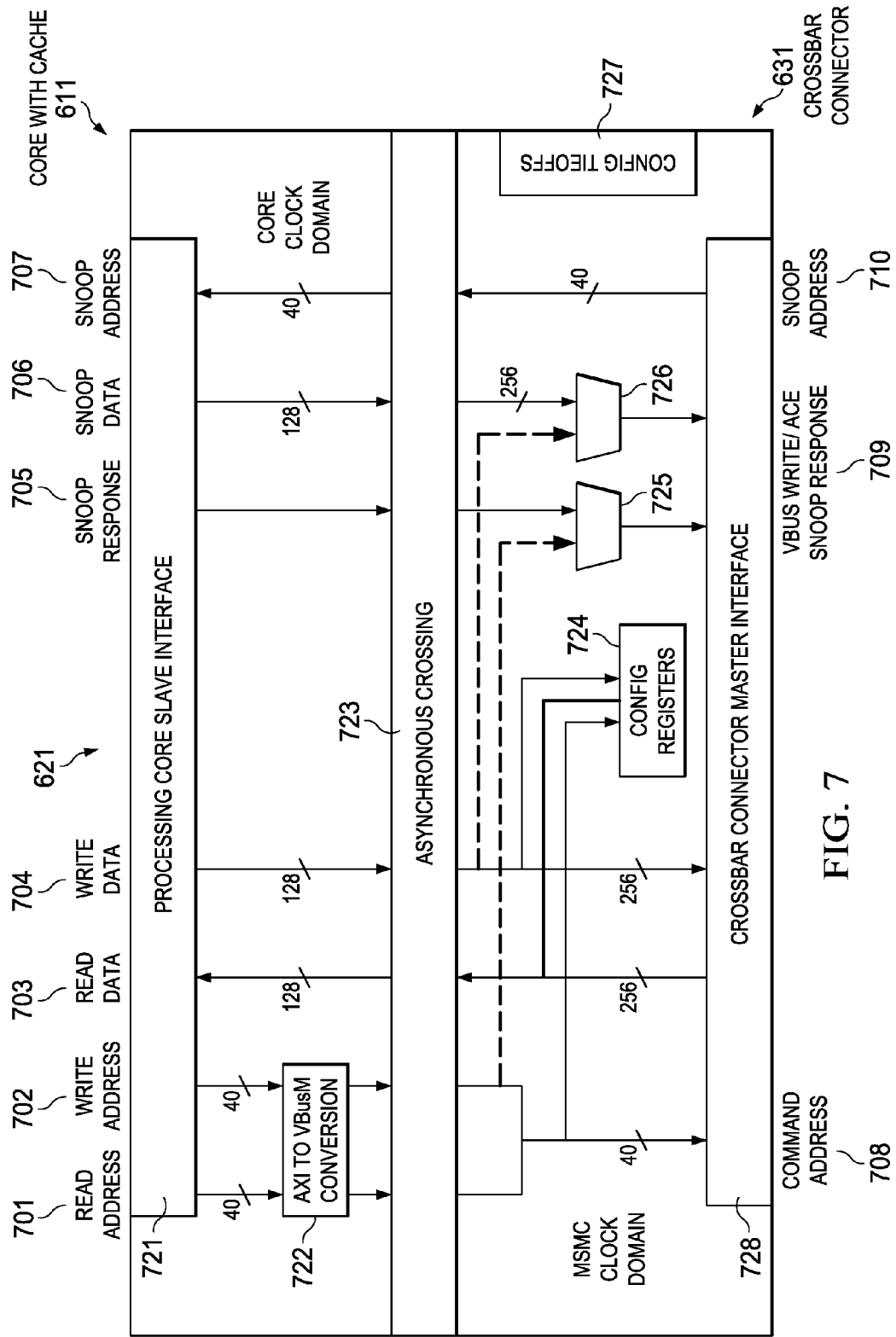
FIG. 7 illustrates an interface between one of the processing cores and the crossbar connector.

FIG. 7 illustrates bus bridge 621 between core with cache 611 and crossbar connector 631. Bus bridge 621 connects to core with cache 611 via: read address bus 701; write address bus 702; read data bus 703; write data bus 704; snoop response bus 705; snoop data bus 706 and snoop address bus 707. Bus bridge 721 responses to core with cache 611 as a slave and provides all the handshake and signal information needed for communication with core with cache 611 as a slave.

Bus bridge 621 supplies the read address and the write address to bus converter 722. In FIG. 7 bus converter 722 preferably converts addresses between an ARM™ AXI bus and a VBusM. The ARM™ AXI has separate channels for read and write transactions. Bus bridge 621 merges the AXI read and write channels onto the single VBusM R/W Command channel via bus converter 722. This merge introduces a possibility that coherent reads can block a following memory update writeback if the coherent read triggered a snoop of other processing cores.

The memory update writes that do not trigger snoops are WriteBack and WriteClean. The coherent writes that may trigger snoops are WriteUnique and WriteLineUnique. A snoop filter in the interconnect allows snooping to be done only when necessary by tracking cache line ownership by all coherent masters. Without a snoop filter, a basic interconnect must snoop all coherent masters for every coherent transaction. This can be inefficient. In the invention multi-core shared memory controller 700 includes this snoop filter as a part of overall coherency support.

The converted read and write addresses as well as the read data, write data, snoop response, snoop data and snoop address pass between clock domains via asynchronous crossing 723. Configuration registers 724 are readable and writeable by core with cache 611 via respective read address 701/read data 703 and write address 702/write data 704. Multiplexer 725 selects either the write address or the snoop response to transmit to crossbar connector 631. Multiplexer 726 selects either the write data or the snoop data to transmit to multi-core shared memory controller 700. Configuration tieoffs 727 enable semi-permanent configuration setting via integrated circuit pin connections.

Crossbar connector master interface 728 controls communication with crossbar connector 631 as a master. Crossbar connector master interface 728 provides all the handshake and signal information needed for communication with crossbar connector 631 as a master.

Instead of creating an entirely separate VBusM Master Interface for all write transactions, bus bridge 721 moves the WriteBack, WriteClean, WriteNoSnoop, and Evict coherent write transactions onto new VBusM Master Interface. Crossbar connector master interface 728 shares its datapath with the existing Snoop Response/Snoop Data Master Interface. The write transactions WriteUnique and WriteLineUnique remain on the original VBusM Master Interface.

Bus bridge 621 transmits either a VBus write command or a snoop response, never both. Data transfers are sent to crossbar connector 631 in the same order as the issued VBus writes and the snoop responses. Furthermore, there is only one data bus 709 on bus bridge 621 for write data and snoop data.

Figure 8:
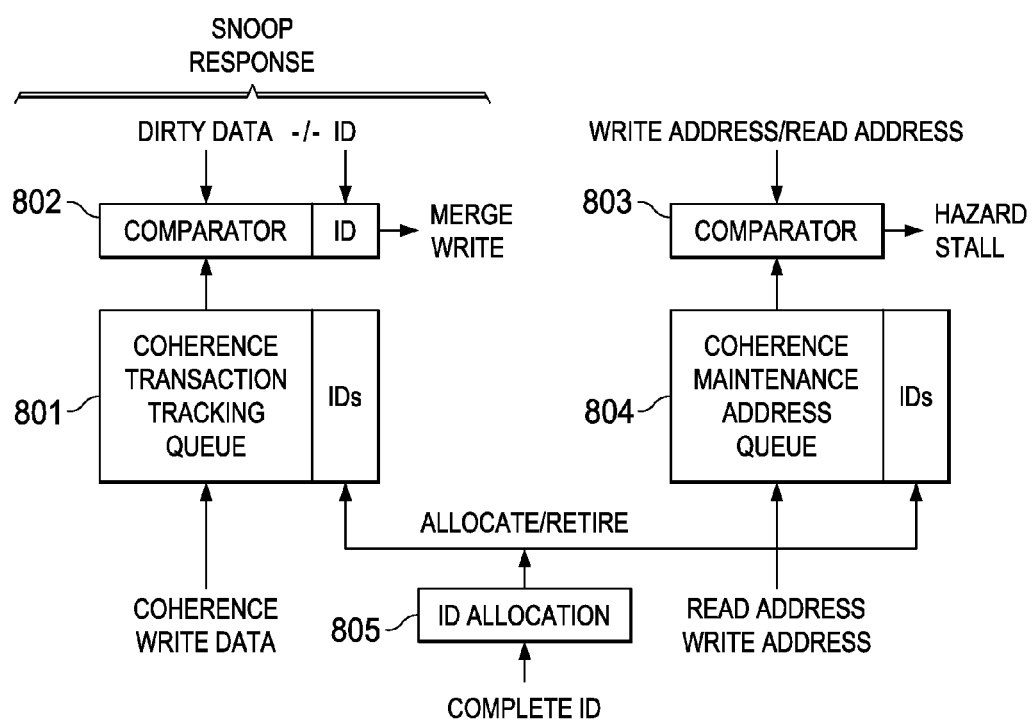
FIG. 8 illustrates a detail of one embodiment of a portion of a memory endpoint controller constructed to practice the distributed coherence control of this invention.

FIG. 8 illustrates a detail of one embodiment of a portion of memory endpoint controller 641 constructed to practice the distributed coherence control of this invention. Note that conventional parts needed for a practical embodiment are omitted for clarity. The following description mentions access addresses. It is known in the art that these addresses need not be the complete endpoint memory address. a number of least significant bits of these addresses could be truncated so that the addresses refer to a larger quantity of data such as a whole cache line.

FIG. 8 illustrates coherence data for a coherence write operation. A coherence write operation includes a non-allocated write and a cache line eviction. Upon a cache miss, a processing core may allocate a cache line to store the data of the memory access generating the cache miss. This cache line is one way of a set corresponding to the memory access address. If the cache line to be replaced is dirty, then the dirty data must be written out to the next level memory. This process is called a victim eviction.

Memory endpoint controller 641 immediately commits the coherence write operation to the endpoint memory. Coherence transaction tracking queue 801 stores the data of this write operation and an assigned ID tag. In a preferred embodiment, the whole data is not stored but only write enable strobes corresponding to the cache dirty tags. Operation with this variation is further explained below.

ID allocation block 805 allocates an identifier to this queue entry. In the preferred embodiment this identifier is a 4-bit ID tag. In the preferred embodiment ID allocation block 805 allocates the lowest unused ID tag rather than using a first-in-first-out scheme. Note that if there are no available ID tags for ID allocation block 805 to assign, then the access stalls until an ID tag is free.

Memory endpoint controller 641 issues a snoop request to all processing cores that may cache the data of the coherence write. Each snoop request includes the ID tag assigned to the coherence write data queue entry. No merge operation is needed if the snoop response is Not Cached, Cached and Clean or Cached and Dirty where the same coherence write data and snoop data are dirty. Comparator 802 compares the coherence write data in coherence transaction tracking queue 801 having the ID tag of the snoop return. If the snoop return is Cached and Dirty with different dirty data in the snoop return than in the coherence write, then comparator 802 triggers a merge write operation. This merge write operation includes only data dirty in the snoop response and clean in the coherence write. As noted above coherence write data queue may store only the corresponding dirty tags or derived write enable strobes. This data and the snoop return data and the dirty tags corresponding to the snoop data from the other processing core are sufficient to determine the data for the merge write. This is advantageous because the dirty tags or write enable strobes comprise less data to be stored in coherence write data queue than the data itself.

Coherence maintenance address queue 804 stores the address of each endpoint memory access. On transmitting an access to the endpoint memory, ID allocation block 805 allocates an ID tag and opens an entry in coherence maintenance address queue 803. In the preferred embodiment ID allocation block 805 uses the same block of 4-bit ID tags for coherence transaction tracking queue 801 and coherence maintenance address queue 804. As previously described, ID allocation block 805 preferably allocates the lowest unused ID tag.

Comparator 803 compares the addresses of all read or write accesses to the entries of coherence maintenance address queue 804. If the addresses do not match, the access is not stalled. If the addresses match, then comparator 803 stalls the current access. Eventually the blocking entry in coherence maintenance address queue 804 will be retired by completion signal from the endpoint memory. The endpoint memory identifies the completion signal by the corresponding ID tag assigned initially by ID allocation block 805. Thereafter the previously stalled access will no longer be blocked.

On-chip memory 651 is organized using 8 banks that consist internally of four sub-banks that hold adjacently addressed locations. The banks are addressed such that 128-byte aligned, 128-byte segments of memory are located in different banks. In addition 32-byte aligned addresses within each 128-byte segment that are addressed in a bank, are located in different sub-banks. The 128-byte banking structure aligns the cache line size of the preferred embodiment.

Figure 9:
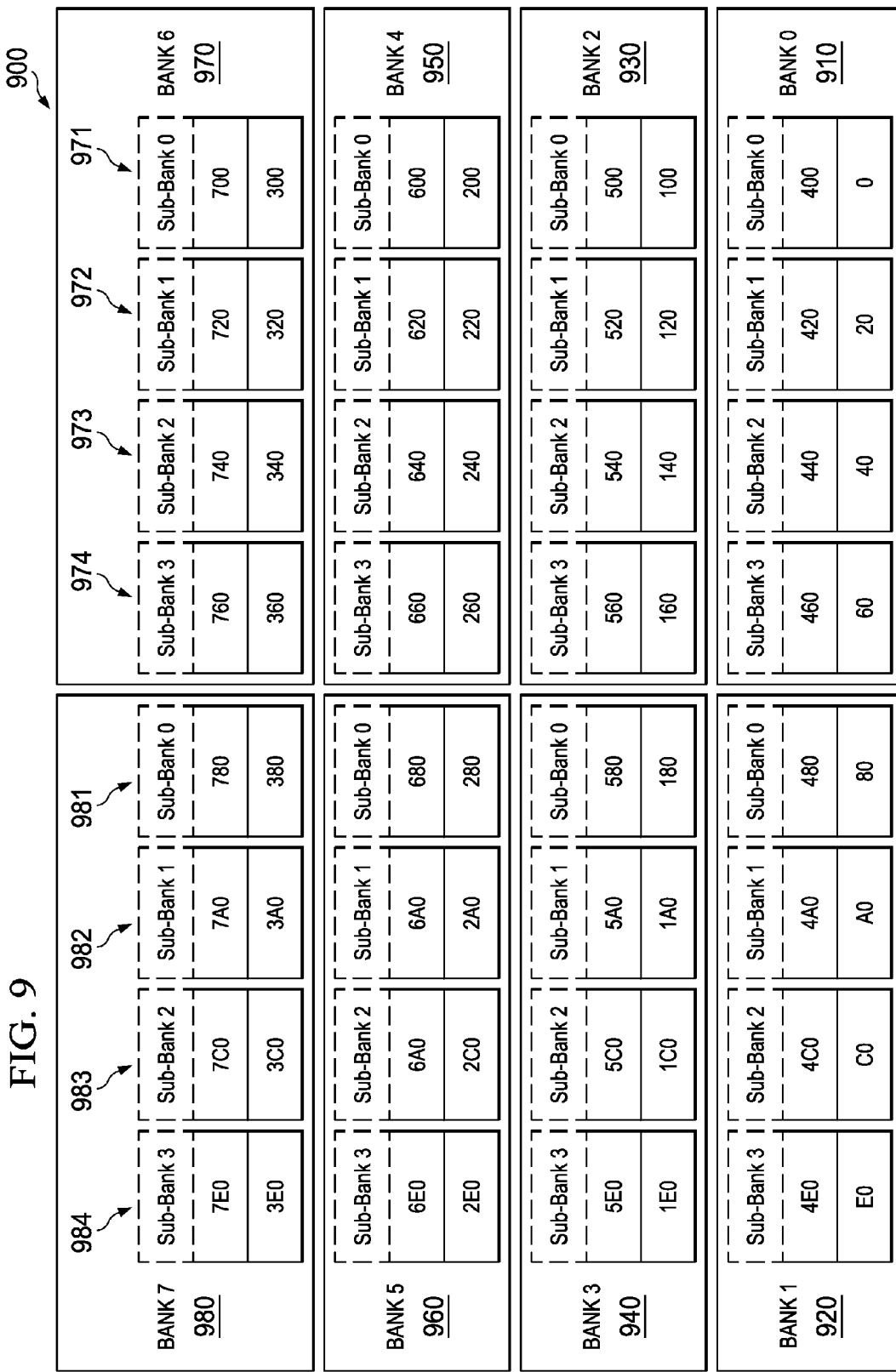
FIG. 9 illustrates the location of consecutive byte addresses in the 8 bank organization of on-chip memory of this invention.

FIG. 9 illustrates the location of consecutive byte addresses in the 8 bank organization of on-chip memory 651 . . . 658 according to an embodiment of this invention. Memory 900 includes 8 memory banks 910, 920, 930, 940, 950, 960, 970 and 980. As illustrated in FIG. 9 each memory banks 910, 920, 930, 940, 950, 960, 970 and 980 includes four subbanks. FIG. 9 illustrates that memory bank 970 includes subbanks 971, 972, 973 and 974. FIG. 9 illustrates that memory bank 980 includes subbanks 981, 982, 983 and 984. In this embodiment bits 7, 8 and 9 of the byte address are used to select between the eight banks 910, 920, 930, 940, 950, 960, 970 and 980. Bits 5 and 6 of the address is used to select the sub-bank in the selected bank such as subbanks 971, 972, 973 and 974 of bank 970 and subbanks 981, 982, 983 and 984 of bank 980. The address mapping shown allows a 128-byte cache line to reside completely in one bank. This permits the remaining banks to be used for other accesses in the same cycle. The sub-banks are 4-wait state, 256-bit wide arrays. Accesses to the half-lines are interleaved among sub-banks in back-to-back cycles. Employing this address mapping shown, each successive 32-byte data phase from the processors cores addresses one sub-bank.

Figure 10:
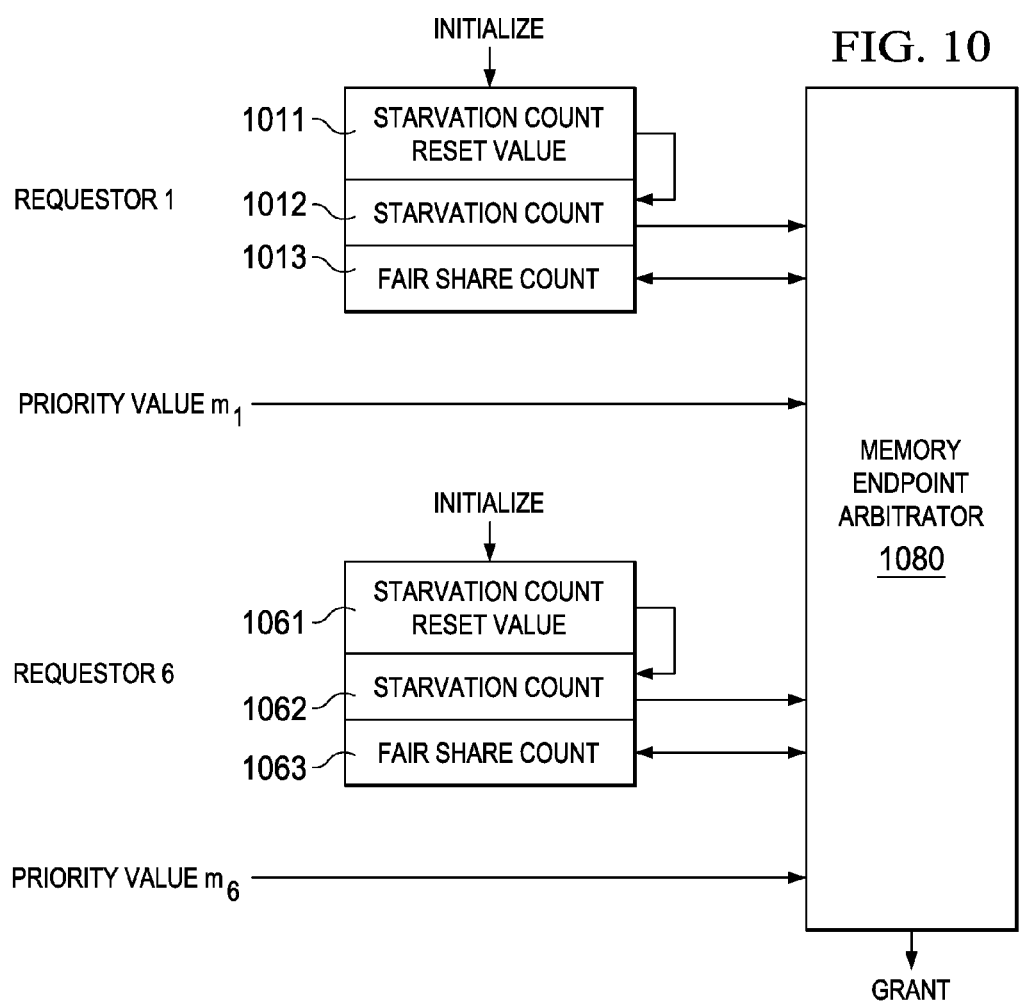
FIG. 10 illustrates relevant portions of the hardware of the arbitration portion of each memory endpoint controller of this invention.

FIG. 10 illustrates relevant portions of the hardware of the arbitration portion of each memory endpoint controller. The arbitration portion of each memory endpoint controller 641, 642 ... 649 uses dynamic three-level priority scheme. These three levels are: priority level; fair share count; and starvation count. The priority scheme attempts to fairly allocate the number of access opportunities and bandwidth among the requesters. FIG. 10 illustrates portions common to each memory endpoint controller 641, 642 ... 649. Memory endpoint controller 641, 642 ... 649 may include additional logic specific to the requirements of the corresponding endpoint. Each requesting processing core with cache 611, 612, 612 ... 619 may present only one access request among all endpoint arbiters in a given cycle. Thus the return path for reads is reserved at the time a command wins arbitration. Access is granted based upon a tuple (m, n) consisting of a priority level m and a fair share count n with a supplemental starvation counter.

FIG. 10 illustrates that each requestor provides a priority level m to the memory endpoint arbitrator 1000. This priority level m is a function of the particular application running on the requestor and the nature of the requestor. This priority level m is expected to be relatively static during operation. A fair share count register (1013, 1063) is assigned to each requester. The value of this fair share count register is supplied to memory endpoint arbitrator 1080. The fair share value is used to select among requestors presenting the same priority level m in a manner that will be explained below. A starvation count reset value (1011, 1061) and a starvation count register (1012, 1062) are provided for each requester. The starvation count reset value is preferably writable by a memory mapped configuration write. The starvation count is initially set to the corresponding starvation count reset value. The starvation count value is changed as detailed below. The starvation count primarily ensures that low priority requestors are not completely shut out by higher priority requestors.

Figure 11:
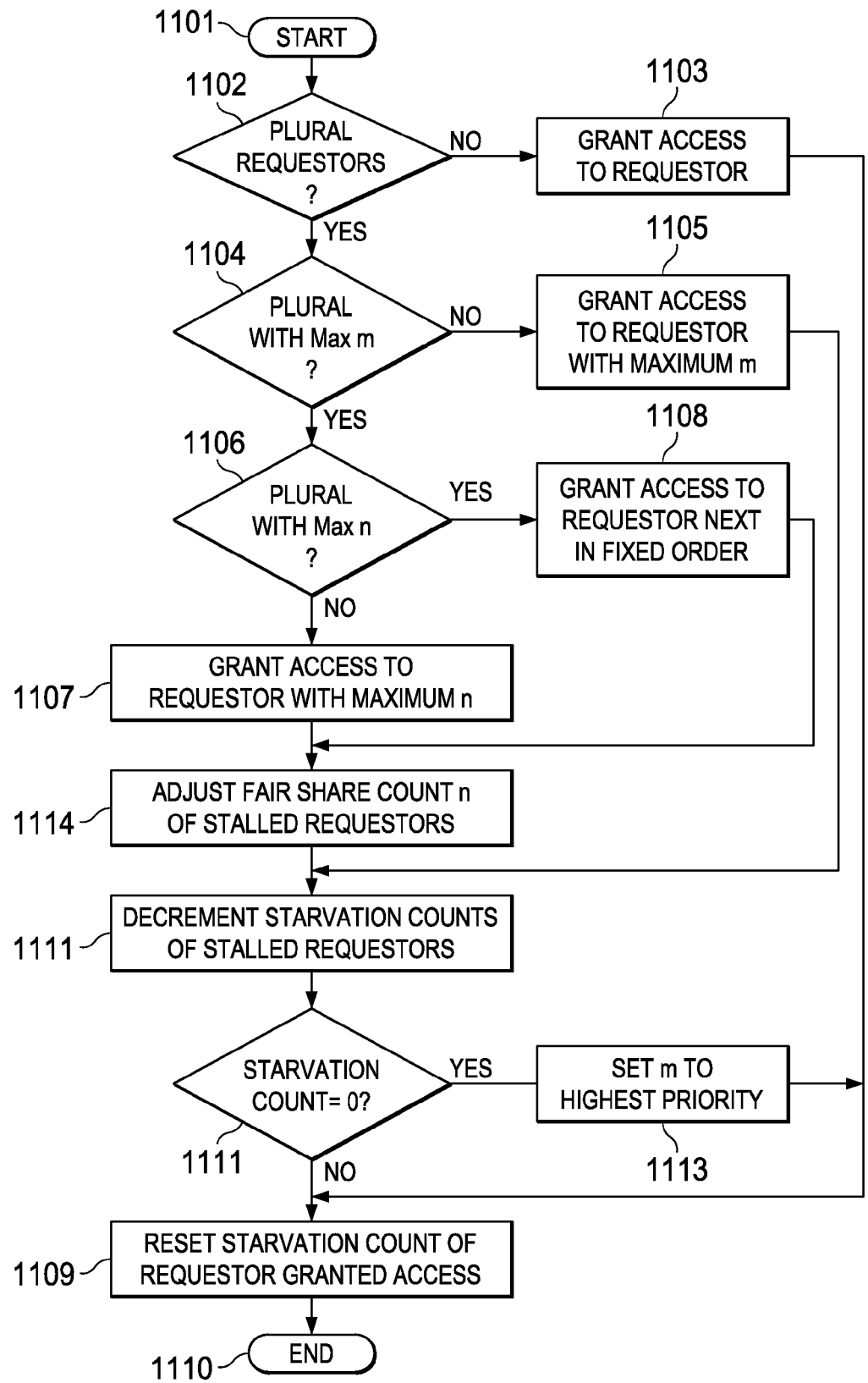
FIG. 11 illustrates the steps in the priority scheme of this invention.

FIG. 11 illustrates the steps in the priority scheme 1100 of this invention. Priority scheme 1100 begins with start block 1101 indicating at least one access request is pending. Step 1102 determines whether there are plural pending access requests. If there is only a single access request pending (No at step 1102), then the pending request is granted access in step 1103. Step 1109 resets the starvation counter for the requestor granted access. Scheme 1100 is then complete for the current cycle and exits at end block 1110.

If there are plural requests for access pending (Yes at step 1102), then step 1104 determines the highest priority level m among the plural pending requests and whether there are plural pending requests having this highest priority level. If there is a single pending request having the highest priority level m (No at step 1106), then this pending request with the highest priority level m is granted access in step 1105.

Priority scheme 1100 then adjusts the starvation counters. Step 1111 decrements the starvation count of any stalled, pending access. Step 1112 determines whether any decremented starvation count has reached zero. If a starvation counter has reached zero (Yes at step 1112), step 1113 sets the priority m of any such requestor at the highest priority. If a starvation counter had not reached zero (No at step 1112) or following step 1113, step 1109 resets the starvation counter for the requestor granted access. Scheme 1100 is then complete for the current cycle and exits at end block 1110.

If there are plural pending requests having the highest priority level m (Yes at step 1104), then step 1106 determines whether there plural requestors having both this maximum priority level m and the same maximum fair share count n. If there is only one such requestor (No at step 1106), then step 1107 grants access to that requestor. Step 1114 adjusts the fair share counts of all pending requestors including the requestor granted access. The fair share count n of each stalled requestor having the maximum priority level m is incremented by 1. The fair share count n of the requestor granted access is decremented by the number of stalled requestors with the same priority level m. This process maintains the sum of the fair share levels n. Step 1111 decrements the starvation count of any stalled, pending access. Step 1112 determines whether any decremented starvation count has reached zero. If a starvation counter has reached zero (Yes at step 1112), step 1114 sets the priority m of any such requestor at the highest priority. If a starvation counter had not reached zero (No at step 1112) or following step 1113, step 1109 resets the starvation counter for the requestor granted access. Scheme 1100 is then complete for the current cycle and exits at end block 1110.

If plural requestors have both the same maximum priority level m and the same maximum fair share count n (Yes at step 11o6), then step 1108 selects a requestor for access grant based upon a fixed order among the plural requestors.

Step 1114 adjusts the fair share counts of all pending requestors including the requestor granted access as previously described. Step 1111 decrements the starvation count of any stalled, pending access. Step 1112 determines whether any decremented starvation count has reached zero. If a starvation counter has reached zero (Yes at step 1112), step 1113 sets the priority m of any such requestor at the highest priority. If a starvation counter had not reached zero (No at step 1112) or following step 1113, step 1109 resets the starvation counter for the requestor granted access. Scheme 1100 is then complete for the current cycle and exits at end block 1110.

The arbitration priority level of a transaction is tracked in terms of a tuple <m, n> where m is the priority level specified in the VBusM command and n is the weighted age-based priority modifier called a fair-share count generated by the arbitration scheme that is tracked per requestor in each arbiter. The fair-share counters for all requestors are initialized to 0 at reset. The three levels are:

1. The arbiter at each available bank selects the request with the highest priority level m.

2. If more than one request has the highest priority value for m, among these requests, the request with the higher fair-share count value n is selected.

3. If there is still a tie, a fixed priority among requestors is used to break this tie.

The fair share count assures equal access among requestors having the same priority level m. The fair share count causes access grant to rotate among these requestors.

The starvation count system prevents a low priority requestor from being permanently frozen out of access. The priority level m is set to the highest priority if the requestor has been continuously stalled for the number of cycles set in the starvation count. Upon promotion of priority the requestor may not gain access the next cycle because there may be another highest priority requestor seeking access. The fair count assures this promoted requestor will obtain access. Resetting the starvation count upon access (step 1109) also resets the promoted priority level to the requestor's base priority level.

System on Chip 600 preferably includes an error detection and correction system. Data stored within SoC 600 includes parity bits for error detection and correction. In the preferred embodiment, a 2-bit detect, 1-bit correct system is used which includes 11 parity bits for each 256 data bits. Upon reading data from an external source to be stored internally (such as internal memories 651 . . . 658 or caches within cores 641 . . . 649), SoC 600 computes a new parity value for the incoming data. This parity data is stored in a parity memory at locations corresponding to the protected data. When a processor core reads from internal memory a new parity value is computed and checked against the stored parity value. Writes by a processing core to any of these memories includes computing a parity value for the new data to be stored in the corresponding location in the parity memory.

Memory banks 651 to 658 include an additional error correction feature called scrubbing. Error detection and correction scrubber 659 is a global state machine that periodically cycles through each location of each memory bank, reading and correcting the data, recalculating the parity bits for the data and storing the data and parity information. This takes place via corresponding read-modify-write cycles. Each read-modify-write of a location by error detection and correction scrubber 659 needs to be atomic. Once error detection and correction scrubber 659 wins arbitration for a bank, it is granted uninterrupted access for the duration of the read and write back of a location. The accesses by error detection and correction scrubber 659 are accorded the highest priority next to victim reads by the bank arbiter. A fully pipelined scrub burst sequence contains 8 reads followed by 8 writes. This locks out the corresponding memory bank for 16 cycles but results in better utilization of the bandwidth available at the banks.

The frequency between scrubbing cycles set by the delay between each burst by Error detection and correction scrubber 659. In the preferred embodiment this may be programmed using a configuration register. A bit field REFDEL is programmed to control the number of clock cycles between each scrub burst. This value is preferably scaled to prevent specification of too frequent scrubbing bursts reducing memory performance. Error detection and correction scrubber 659 is enabled by default at reset but may be disabled by resetting a bit in a configuration register.

Error detection and correction scrubber 659 preferably can log errors and locally collect statistics about scrubbing errors. If error detection and correction scrubber 659 detects a 1-bit correctable error, it preferably corrects the error to restore the data and logs the address of the error and the syndrome value identifying the erroneous bit and increments a SCEC (Scrub Correctable Error Counter) field in a corresponding configuration register. If error detection and correction scrubber 659 detects a 2-bit error which is not correctable, it logs the address and increments the SNCEC (Scrub Non-Correctable Error Counter). The SCEC and SNCED fields can be read to provide statistics on error generation. This permits adjustment of the number of clock cycles between each scrub burst based upon error rate. If the error rate is high, scrub cycles may be initiated more frequently. If the error rate is low, less frequent scrubbing may be implemented to reduce power consumption and interference with functional memory access traffic.

Figure 12:
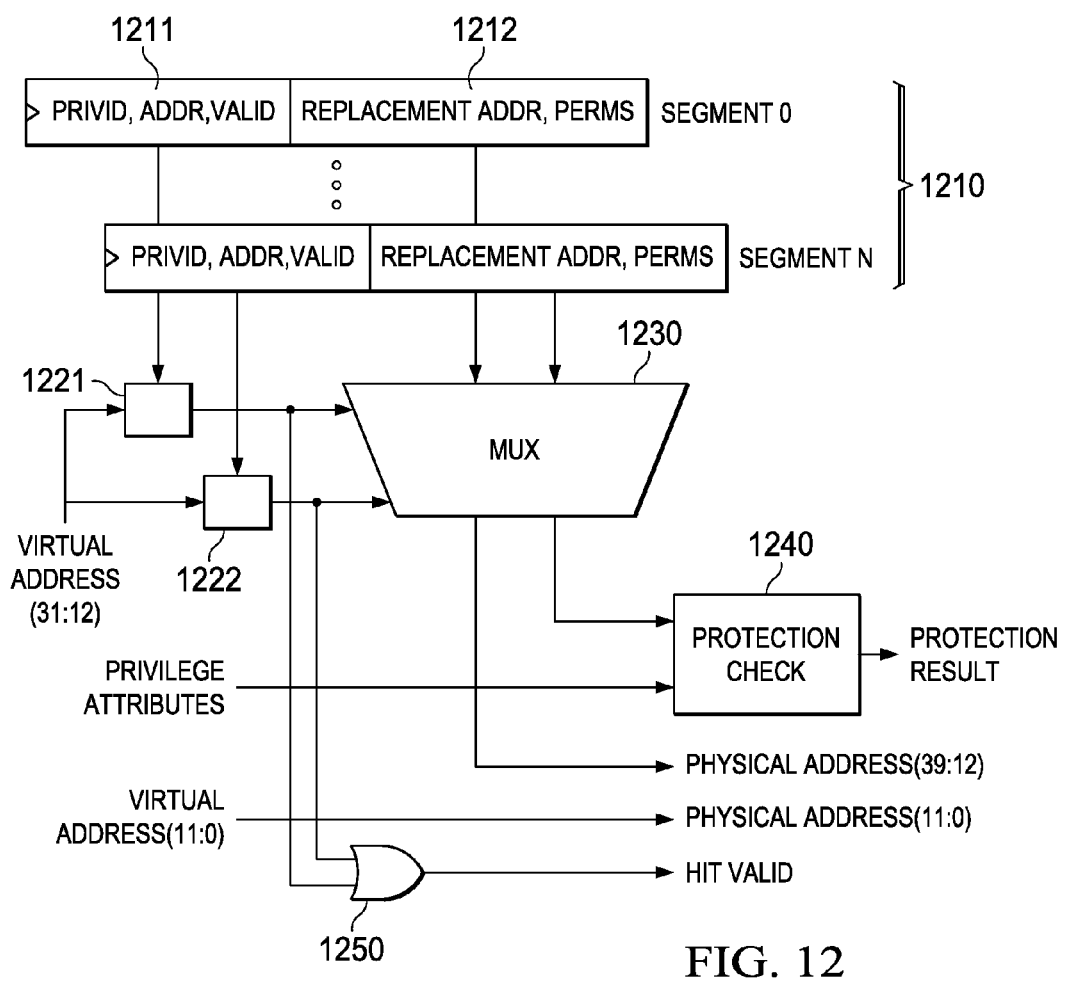
FIG. 12 illustrates memory mapping according to preferred embodiment of this invention.

FIG. 12 illustrates memory mapping according to a preferred embodiment of this invention. A plurality for segment registers 1210 store attributes and replacement addresses for corresponding segments of the address space. Each segment register 1210 includes an upper section 1211 storing a privilege identity (PRIVID) for the corresponding segment, a base segment address and a valid indicator. Each segment register 1210 includes a lower section 1212 storing the upper order bits of the replacement address and permissions required for that memory segment. Comparators 1221 and 1222 compare an incoming virtual address with the privilege identity (PRIVID), base segment address and valid indicator of the upper section 1211 of a corresponding segment register 1210. Valid OR gate 1250 generates an active Hit/Valid signal if the virtual address matches the address of a segment register, the requestor presents a matching PRIVID and the segment is marked as valid. Upon such a hit multiplexer 1230 selects the replacement address and permissions of the segment register hit. Protection check comparator 1240 compares the permission recalled from the hit segment register with the privilege attributes of the requestor. If these match protection check comparator 120 generates a protection result permitting this access. The mapped physical address is the upper bits (here illustrated as bits 12 to 39 (recalled from the hit segment register) and lower bits (here illustrated as bits 0 to 11) from the original virtual address of the requestor.

Segment registers 1210 may cover all memory space, thus a hit is guaranteed for all valid addresses. Alternately, the data in segment registers 1210 may be replaces on an as needed basis in a data cache-like fashion.

Figure 13:
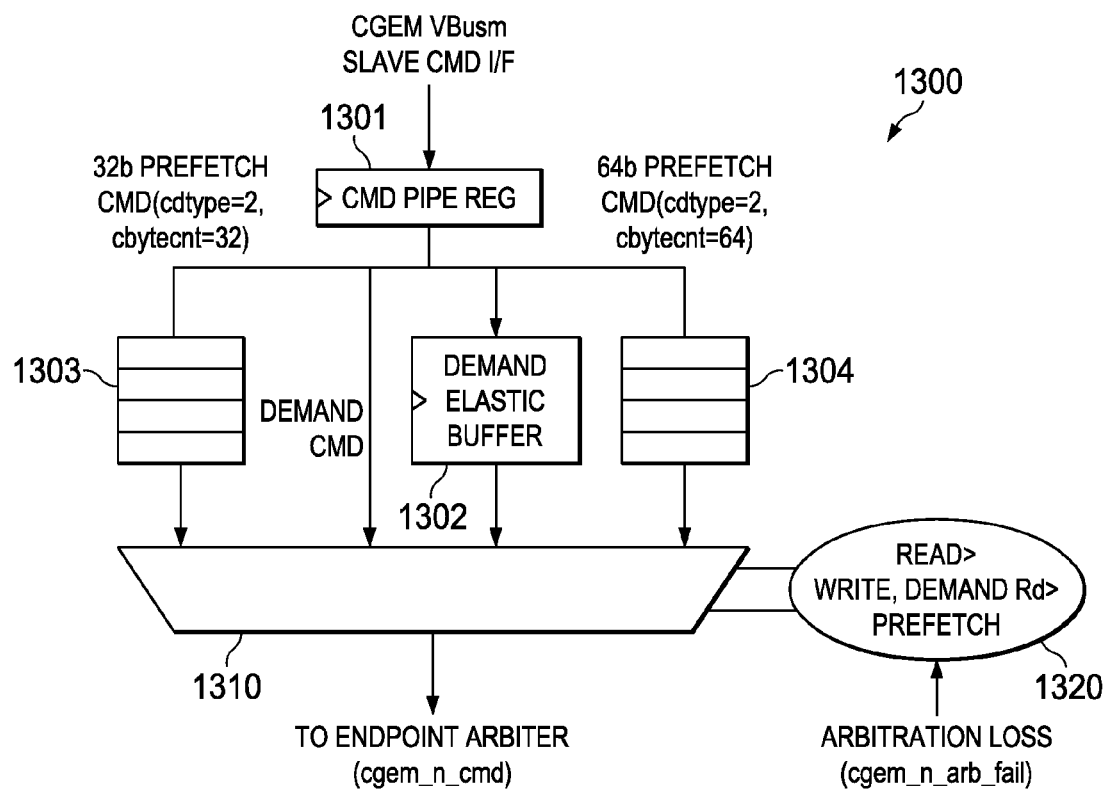
FIG. 13 illustrates the structure of a command reordering buffer according to this invention.

Each processing core with cache 611, 612, 613 . . . 619 a command reordering buffer 1300 as illustrated in FIG. 13. Each processing core with cache 611, 612, 613 . . . 619 may issue demand access requests for reads or writes or may issue prefetch commands. Prefetch commands are issued based upon prior demand accesses causing a cache miss in an attempt anticipate following demand requests. A completed prefetch command stores data in a cache on anticipation a following demand access may hit this data in the cache. An effective prefetch thus anticipates demand accesses by the processing core and hides the cache miss latency. Command reordering buffer 1300 is organized to compensate for the latency between cache traffic controller inside the processing core and the memory controller. Command reordering buffer 1300 is organized to facilitate traffic management between read and write demand requests and prefetch read requests.

For demand requests, the command reordering buffer 1300 can store up to two non-speculative (demand) commands before it stalls further demand requests. A first demand command is stored in command pipeline register 1301. A second demand command may be stored in demand elastic buffer 1302. Demand elastic buffer 1302 is only used to store a command when the demand command in command pipeline register 1301 that is presented to an endpoint arbiter fails to win arbitration. Command reordering buffer 1300 can store prefetches of two sizes. Command reordering buffer 1300 can store up to 4 32-byte prefetch requests consisting of program prefetches due triggered by a L1I 121 cache miss. Command reordering buffer 1300 can store up to 4 64-byte prefetch requests consisting of data prefetches trigger by an L1D 123 cache miss or triggered by an L2 130 cache miss.

Every memory access cycle, one command is selected from command reordering buffer 1300 to be presented to the endpoint arbiters at the memory banks. If a cdepend signal on the processing core interface is high the commands are selected in order of arrival. If cdepend is low commands addressing internal memory or external memory are re-ordered to improve performance using the rules. Demand reads are selected ahead of prefetch reads of any size. Demand read requests are selected ahead of independent write requests if there is no addressed range overlap between the read and the write. Prefetch reads are selected ahead of independent write requests with no addressed range overlap between the prefetch read and the write with a lower priority. In this case 64 byte prefetch reads are selected ahead of write requests and 32 byte prefetch requests and 32 byte prefetch requests are selected ahead of write requests.

The following reordering limitations apply. For back to back writes to different endpoints, an inactive ready signal from the first endpoint can block the second write command. The write commands will not be reordered to allow the second write command to pass the first if the endpoint for the first command blocks the write data. This allows writes from other slave ports to address the second endpoint and not be blocked. If a write command presented by the command reorder buffer wins arbitration at the endpoint in the same cycle that a new demand read is latched into the pipeline register, the arbitration slot is forfeited and the command presented to the endpoint arbiter is switched to the demand read.

What is claimed is:

1. A data processing system comprising:
  a plurality of processing cores, said processing cores at least one processing core having a first bus protocol and at least one processing core having a second bus protocol;
  a bus converter connected to an address bus and a command address bus of each of said at least one processing core having a first bus protocol for converting said address from said first bus protocol to said second bus protocol supplied to said command address bus;
  a plurality of memory endpoints, each memory endpoint adapted for connection to a memory; and
  a crossbar connector connected to said plurality of processing cores, said bus converter and said plurality of memory endpoints for routing access requests from said processing cores to said memory endpoints having addresses converted from said first bus protocol to said second bus protocol by said bus converter and routing data between said processing cores and said memory endpoints.

2. The data processing system of claim 1, wherein:
  said at least one processing core having a first bus protocol operates at a first clock frequency;
  said at least one processing core having a second bus protocol operates at a second clock frequency different from said first clock frequency; and
  further comprising an asynchronous crossing unit connecting a first clock domain including said at least one processing core having a first bus protocol to a second clock domain including said at least one processing core having a second bus protocol.

3. The data processing system of claim 2, wherein:
  said crossbar connector is disposed in said second clock domain.

4. The data processing system of claim 2, wherein:
  each of said memory endpoints is disposed in said second clock domain.

5. The data processing system of claim 2 wherein:
  each of said memory endpoints includes a coherence unit, each coherence unit including
    a coherence maintenance address queue having a plurality of entries, each entry storing an address of an access request committed to the shared memory and an assigned ID tag,
    an ID allocation block coupled to said coherence maintenance address queue assigning an available ID tag from a set of ID tags to an access committed to the shared memory for storage in said coherence maintenance address queue and retiring a coherence maintenance address queue entry upon receipt of a completion signal from the shared memory indicating completion of the corresponding access, and
    a comparator coupled to said input ports and said coherence maintenance address queue and receiving an address of a memory access request, said comparator comparing the address of the memory access request with all addresses stored in said coherence maintenance address queue and generating a hazard stall signal if the address of the memory access request matches any address stored in said coherence maintenance address queue.

6. The data processing system of claim 5, wherein:
  each of said coherence units further includes
    a coherence transaction tracking queue having a plurality of entries, each entry storing dirty tags corresponding to coherence write data and an assigned ID tag,
    a comparator connected to said coherence transaction tacking queue and receiving dirty tags corresponding to snoop response data, said comparator determining where snoop response dirty tags indicate dirty and said stored dirty tags indicate clean and inactive elsewhere, said comparator causing a write of received snoop response data that is dirty in the snoop response and clean in the coherence write data to the shared memory, and
    said ID allocation block is further coupled to said coherence transaction tracking queue and operable to assign an available ID tag from said set of ID tags upon creation of an entry within said coherence transaction tracking queue.

7. The data processing system of claim 5, wherein:
  said ID allocation block assigns a lowest available ID tag upon allocating an ID tag.

8. The data processing system of claim 1, wherein:
  each of said processing cores includes a memory translation unit including
    a plurality of segment registers, each segment register including a first address field, a privilege identity field and a second address field,
    a plurality of comparators receiving an address and a privilege identity tag from a processing core requesting access,
    a multiplexer connected to said segment registers for selecting said second address field of a segment register having a first plurality of most significant bits matching said first address field and a privilege identity matching said privilege identity field;
  wherein said memory translation unit forms a translated address having a first set of least significant bits corresponding to said address of said processing core requesting access and a second set of most significant bits corresponding to said second address field selected by said multiplexer.

9. The data processing system of claim 1, wherein:
each of said processing cores includes a command re-ordering buffer receiving access requests and selecting one access request to forward to said crossbar connector, said command re-ordering buffers selecting a demand read before a prefetch request and selecting a prefetch request before a demand write.

* * * * *